(12) United States Patent
Nowak et al.

(10) Patent No.: US 10,404,372 B2
(45) Date of Patent: Sep. 3, 2019

(54) SYSTEM AND METHOD FOR PROCESSING AN ELECTROMAGNETIC SIGNAL

(71) Applicant: Rohde & Schwarz GmbH & Co. KG, Munich (DE)

(72) Inventors: Thomas Nowak, Oberbergkirchen (DE); Christian Volle, Haar (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 15/874,585

(22) Filed: Jan. 18, 2018

(65) Prior Publication Data

US 2018/0205462 A1 Jul. 19, 2018

(30) Foreign Application Priority Data

Jan. 19, 2017 (EP) .................................... 17152195

(51) Int. Cl.
| | | |
|---|---|---|
| H04B 10/2543 | (2013.01) | |
| H04B 10/25 | (2013.01) | |
| H04B 10/2575 | (2013.01) | |
| H04B 1/14 | (2006.01) | |
| H04B 10/58 | (2013.01) | |
| H04B 1/18 | (2006.01) | |
| H04B 10/85 | (2013.01) | |

(52) U.S. Cl.
CPC ........... *H04B 10/2543* (2013.01); *H04B 1/14* (2013.01); *H04B 1/18* (2013.01); *H04B 10/2504* (2013.01); *H04B 10/2575* (2013.01); *H04B 10/25759* (2013.01); *H04B 10/58* (2013.01); *H04B 10/85* (2013.01); *H04B 2210/254* (2013.01)

(58) Field of Classification Search
CPC ............ H04B 10/2543; H04B 10/2504; H04B 10/58; H04B 10/25759; H04B 1/14; H04B 10/2575; H04B 2210/254; H04B 10/85

See application file for complete search history.

(56) References Cited

U.S. PATENT DOCUMENTS

| | | | | |
|---|---|---|---|---|
| 5,339,184 A | * | 8/1994 | Tang ................. | H04B 10/25752 370/343 |
| 6,016,426 A | * | 1/2000 | Bodell ............. | H04B 10/25759 455/422.1 |
| 8,867,931 B2 | * | 10/2014 | Gupta ................. | H04L 27/2096 398/115 |

(Continued)

FOREIGN PATENT DOCUMENTS

| | | |
|---|---|---|
| EP | 1195927 A2 | 4/2002 |
| EP | 1981175 A1 | 10/2008 |
| WO | 2011/113097 A2 | 9/2011 |

OTHER PUBLICATIONS

Extended European Search Report dated Jul. 4, 2017, issued in corresponding European Application No. 17152195.8, filed Jan. 19, 2017, 7 pages.

*Primary Examiner* — Mina M Shalaby
(74) *Attorney, Agent, or Firm* — Christensen O'Connor Johnson Kindness PLLC

(57) ABSTRACT

A system for processing an electromagnetic signal is described, wherein the system comprises a transmission path with limited dynamic range and a pre-selection unit that is positioned upstream the transmission path. The pre-selection unit is configured to pre-select signal portions and to control the level of the output electromagnetic signal. Further, a method for processing an electromagnetic signal is described.

19 Claims, 2 Drawing Sheets

(56) References Cited

U.S. PATENT DOCUMENTS

| | | | |
|---|---|---|---|
| 9,407,369 B2* | 8/2016 | Yu | H04B 10/118 |
| 9,917,638 B1* | 3/2018 | Bartur | H04B 10/0793 |
| 2005/0026564 A1 | 2/2005 | Haub et al. | |
| 2010/0114243 A1 | 5/2010 | Nowak et al. | |
| 2013/0216231 A1 | 8/2013 | Yang et al. | |

* cited by examiner

SYSTEM AND METHOD FOR PROCESSING AN ELECTROMAGNETIC SIGNAL

TECHNICAL FIELD

Embodiments of the present disclosure relate to a system for processing an electromagnetic signal as well as a method for processing an electromagnetic signal.

BACKGROUND

A system for processing an electromagnetic signal can be used for transmitting an electromagnetic signal and/or for receiving an electromagnetic signal. The electromagnetic signal may be transmitted and/or received via an antenna system. In a system that is used for receiving an electromagnetic signal, the antenna system receives electromagnetic waves that are converted into an electrical signal for further processing, in particular an electric current. The electrical signal is transmitted via a transmission path to a radio receiver for analyzing purposes.

Due to structural restrictions at the installation site of the system, customers using such a system may have to bridge a long distance between the antenna system and the radio receiver, for instance 10 to 100 meters or even more. Accordingly, a transmission path has to be used that ensures high information security, high interference immunity and very good performance, simultaneously. This means that persons being not authorized shall not have any access to the information transmitted via the transmission path (high information security). Further, no electromagnetic radiation shall be emitted from or irradiated into the transmission path (high interference immunity), in particular parasitic electromagnetic interferences. In addition, a wide dynamic range, a low noise factor and a high linearity shall be ensured by the system (very good performance). In general, the very good performance corresponds to very good radio frequency data processed by the system.

In the state of the art, several systems are known for processing an electromagnetic signal even though a long distance has to be bridged between the antenna system and the radio receiver. For instance, systems are known that use a coaxial transmission line for transmitting radio frequency signals received via the antenna system as this ensures that broadband signals can be transmitted while a high linearity is achieved. However, coaxial transmission lines have a high attenuation that is frequency dependent.

Further, systems are known that transmit the information digitally, for instance via a local area network transmission line (LAN connection), as the signals can be transmitted over long distances in a lossless manner. However, the information security is low as an existing network has to be used wherein unauthorized persons may break into that network. In addition, a local area network connection can only be used for connecting the radio receiver with a control and/or analyzing unit. Thus, the radio receiver has to be installed close to the antenna system.

It is also known in the prior art to use fiber optic cables for transmitting radio frequency signals received via the antenna system. This is called radio frequency over fiber (RFoF). Thus, the electric signals obtained by the antenna system have to be converted into an optical signal that is transmitted to the radio receiver wherein the optical signal is reconverted into an electrical signal prior to the radio receiver. The optical transmission path ensures low attenuation (loss) and high information security. However, an optical transmission path has a limited dynamic range, a high noise factor as well as a high non-linearity resulting in unwanted harmonics.

SUMMARY

Accordingly, there is a need for a system for processing an electromagnetic signal having optimized characteristics with regard to performance, dynamic range, linearity and cost-efficiency.

Embodiments of the present disclosure provide a system for processing an electromagnetic signal, wherein the system comprises a transmission path with limited dynamic range and a pre-selection unit that is positioned upstream the transmission path, wherein the pre-selection unit is configured to pre-select signal portions and to control the level of the output electromagnetic signal.

Further, embodiments of the present disclosure provide a method for processing an electromagnetic signal, in particular by using a system as described above, with the following steps:

receiving an electromagnetic signal via an antenna system;

pre-selecting the electromagnetic signal by using a pre-selection unit;

transmitting the electromagnetic signal via a transmission path with limited dynamic range, in particular an optical transmission path; and receiving the electromagnetic signal via a radio receiver that is connected to the pre-selection unit via the transmission path.

Accordingly, the transmission path having limited dynamic range can be used to its maximum by positioning the pre-selection unit upstream the transmission path such that interfering influences caused by non-linearity are reduced, in particular filtered, prior to the transmission via the transmission path. Hence, unwanted harmonics or harmonic distortion signals can be suppressed or eliminated by using the pre-selection unit. Further, the pre-selection unit has a level control ensuring that the dynamic range can be shifted appropriately prior to forwarding the electromagnetic signal to the transmission path such that the electromagnetic signal is transmitted via the transmission path in an optimal manner as no compression occurs. Accordingly, the electromagnetic signal can be controlled with regard to the output level and filtered during the pre-selecting step.

Generally, the level control of the pre-selection unit may be formed as an automatic gain control. Hence, the output level of the electromagnetic signal forwarded to the transmission path is maintained constant irrespective of the level of the electromagnetic signal received. Further, the dynamic range may be automatically shifted with respect to the level of the electromagnetic signal.

According to an aspect, an antenna system is provided that is connected to the pre-selection unit. The electromagnetic signals received may be electromagnetic waves that are converted by the antenna system into an electrical signal, in particular electric currents, forwarded to the pre-selection unit. The pre-selection unit is directly connected to the antenna system such that signal portions of the electromagnetic signal received, in particular the appropriately converted electrical signal, are initially pre-selected by the pre-selection unit such that interfering influences caused by non-linearity are reduced at the beginning. Hence, harmonic distortions are suppressed by the pre-selection unit.

In some embodiments, the transmission path is an optical transmission path. Thus, low attenuation and high interference immunity are ensured. As the electromagnetic signal transmitted via the optical transmission path is pre-processed in the pre-selection unit, the low dynamic range of the optical transmission path is used to the maximum. Thus, the low dynamic range is only a significantly reduced drawback. The optical transmission path may comprise an optical fiber that is used for bridging long distances.

According to a certain embodiment, an optical transmitter is provided that is positioned downstream of the pre-selection unit. The optical transmitter is part of the optical transmission path, and in some embodiments, at the beginning of the optical transmission path. Therefore, the optical transmitter can be deemed as a first interface between the electrical signal and the optical signal. The electric signal being pre-processed by the pre-selection unit is converted into an optical signal that is transmitted via the optical transmission path ensuring low losses and high interference immunity. The optical transmitter is connected with the optical fiber wherein the optical transmitter transmits the optical signal into that optical fiber.

Further, an optical receiver may be provided that is positioned downstream the optical transmitter. The optical receiver corresponds to the end of the optical transmission path as it (re-)converts the optical signal into an electrical signal. Thus, the optical transmitter is the second interface of the optical transmission path. The electrical signal can be processed further by other components of the system being connected to the optical transmitter, for instance a radio receiver. The optical receiver is connected with the optical fiber wherein the optical receiver receives the optical signal from the optical fiber.

Generally, the electromagnetic signal may be an optical signal, an electrical signal and/or electromagnetic waves. Usually, the signal is converted several times since the antenna system receives electromagnetic waves that are converted into an electrical signal, e.g., electric currents. The electrical signal is then converted into an optical signal which is later reconverted into an electrical signal. All these signals comprise the same information and/or data as the original electromagnetic waves received by the antenna system. However the different types of signals, e.g., electromagnetic waves, electrical signal and optical signal, fall under the generic term electromagnetic signal.

According to an aspect, a broadband radio receiver is provided that is positioned downstream of the transmission path, e.g., downstream of the optical receiver. The pre-selection unit is not directly connected to the broadband radio receiver since the transmission path is located between the pre-selection unit and the broadband radio receiver. Thus, the pre-selection unit is not part of the broadband radio receiver as it is separately formed with respect to the broadband radio receiver. Only pre-selected electromagnetic signals without any disturbing signal portions are forwarded to the broadband radio receiver that have been transmitted via the transmission path with limited dynamic range. As the transmission path is positioned between the pre-selection unit and the broadband radio receiver, the pre-selection unit and the broadband radio receiver may have a long distance between each other.

According to another aspect, the broadband radio receiver is connected to the pre-selection unit via a feedback line. Therefore, the broadband radio receiver is configured to obtain information about the state of the pre-selection unit. This means that the broadband radio receiver that is located downstream of the transmission path is permanently informed about the interaction of the pre-selection unit located upstream the transmission path. For instance, the broadband radio receiver receives information about how the pre-selection unit influences the received electromagnetic signal with regard to the pre-selecting parameters and the level control. This ensures that a misinterpretation of the electromagnetic signal received by the antenna system is avoided. For instance, the radio receiver is informed about an attenuation element that is switched on in the pre-selecting unit. As the broadband radio receiver receives this information, the broadband radio receiver is able to determine the correct level of the electromagnetic signal received. The broadband radio receiver receives continuously information from the pre-selection unit via the feedback line without any dead time.

In some embodiments, the broadband radio receiver is configured to control the pre-selection unit. Thus, the radio receiver is also able to directly interact with the pre-selection unit in order to specify the parameters to be used by the pre-selection unit for pre-processing the electromagnetic signals received. For instance, the broadband radio receiver can adjust filters and/or attenuation elements of the pre-selection unit. The feedback line is configured to be a control and feedback line.

According to a certain embodiment, the pre-selection unit is configured to be self-controlled and/or controlled by an external component being connected to the pre-selection unit. Thus, the pre-selection unit can automatically determine the parameters to be used during the pre-selection process. Alternatively or supplementary, an external component can be used to control the pre-selection unit, e.g., wherein the external component may be controlled by a user of the system.

In general, the pre-selection unit can be controlled and/or regulated by its own, the broadband radio receiver and/or an external component connected to the pre-selection unit. The control and/or regulation may be performed partly by these different modules.

The system may comprise a first device that comprises the antenna system, the pre-selection unit and/or the optical transmitter. Further, the system may comprise a second device that comprises the optical receiver and/or the broadband radio receiver. Both devices may be connected with each other via the optical fiber of the transmission path such that the optical fiber connects two separately formed devices over a long distance. The components of each device may be at least partly housed in a common housing, respectively. For instance, the antenna system of the first device, if any, is only partly housed.

Moreover, a control and analyzing unit may be provided, e.g., wherein the control and analyzing unit is connected to the broadband radio receiver. Thus, the data or information obtained from the electromagnetic signal processed in the broadband radio receiver is forwarded to the control and analyzing unit for analyzing and control purposes. The control and analyzing unit may have an operational component that can be used by the customer of the system in order to make certain settings with regard to the system.

In some embodiments, the pre-selection unit comprises at least one sub-octave filter. The sub-octave filter is a band-pass filter used for pre-selecting the signal portions of the electromagnetic signal received. Generally, the sub-octave filter is tunable and switchable in order to reduce the number of unwanted input signal (portions). Accordingly, harmonic distortion signals can be prevented effectively in the radio receiver that is connected to the pre-selection unit via the transmission path. Particularly, a filter bank may be provided that comprises several sub-octave bandpass filters.

According to an aspect, the electromagnetic signal is converted into an optical signal by using an optical transmitter prior to the transmitting step and/or reconverted into an electrical signal by using an optical receiver after the transmitting step. Thus, the optical transmitter and the optical receiver correspond to interfaces between the electrical signals and the optical ones. Moreover, both optical units are parts of the transmission path, in particular wherein the optical transmitter and the optical receiver correspond to the beginning of the transmission path and its end, respectively.

Moreover, the pre-selection unit may be self-controlled, controlled by the radio receiver and/or controlled by a third component that is connected to the pre-selection unit. Accordingly, different components can be used for controlling the pre-selection unit. These different parts may be used solely for controlling purposes or in a combined manner such that different parameters are controlled by different parts of the system.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
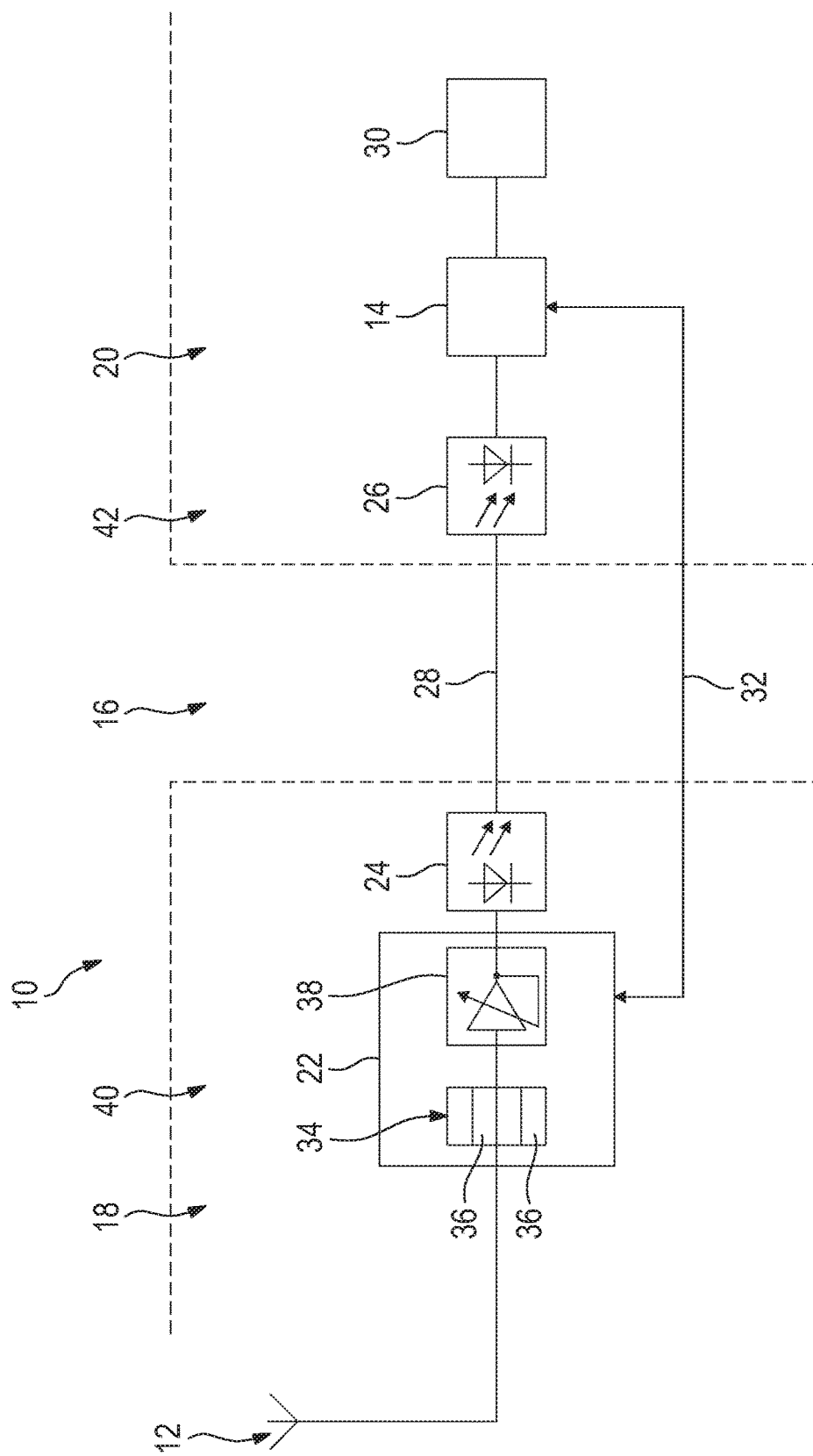
FIG. 1 schematically shows a system for processing an electromagnetic signal.

In FIG. 1, a system 10 for processing an electromagnetic signal is shown that comprises an antenna system 12 and a broadband radio receiver 14 that are connected with each other via a transmission path 16 with limited dynamic range (limited dynamics). In the shown embodiment, the transmission path 16 is established by an optical transmission path.

The antenna system 12 is located at an antenna site 18 whereas the broadband radio receiver 14 is located at a receiver site 20. Both sites 18, 20 may be distant from each other by a long distance, for instance 10-100 meters or even more. Accordingly, a long distance has to be bridged by the transmission path 16 wherein high information security, high interference immunity and very good performance have to be ensured while electromagnetic signals are transmitted via the transmission path 16.

The system 10 comprises a pre-selection unit 22 that is directly connected to the antenna system 12 such that an electromagnetic signal received via the antenna system 12 is pre-processed by the pre-selection unit 22.

In addition, the pre-selection unit 22 is connected to the transmission path 16 wherein the transmission path 16 comprises an optical transmitter 24 corresponding to the beginning of the (optical) transmission path 16 as the optical transmitter 24 converts the electromagnetic signal received, in particular an electrical signal, into an optical signal. The optical transmitter 24 is directly connected to the pre-selection unit 22. In other words, the pre-selection unit 22 is interconnected between the antenna system 12 and the optical transmitter 24 such that the antenna system 12 and the optical transmitter 24 are located upstream and downstream the pre-selection unit 22, respectively.

The end of the (optical) transmission path 16 is formed by an optical receiver 26 that is directly connected to the broadband radio receiver 14.

As already mentioned, the optical transmission path 16 comprises the optical transmitter 24 and the optical receiver 26 that correspond to the beginning and the end of the optical transmission path 16, respectively. In addition, an optical fiber 28 is provided that interconnects the optical transmitter 24 and the optical receiver 26. This optical fiber 28 is used to bridge the long distance that is provided between the antenna site 18 and the receiver site 20.

Generally, the optical transmission path 16, e.g., the optical fiber 28, ensures low attenuations (losses) and high electromagnetic interference immunity while processing the electromagnetic signal.

The system 10 also comprises a control and analyzing unit 30 that is directly connected to the broadband radio receiver 14 such that the data obtained by the radio receiver 14 is forwarded to the control and analyzing unit 30. The control and analyzing unit 30 may also have an operational function such that a customer of the system 10 may make settings with regard to the system 10 via the control and analyzing unit 30.

The broadband radio receiver 14 is also connected with the pre-selection unit 22 via a control and feedback line 32 in a bidirectional manner such that data can be exchanged between the broadband radio receiver 14 and the pre-selection unit 22 as will be described later with regard to the functionality of the system 10 and the method illustrated in the flow-chart of FIG. 2.

In the shown embodiment, the pre-selection unit 22 has a filter bank 34 comprising several sub-octave (bandpass) filters 36 as well as a level control 38. The filter bank 34 is used to reduce the number of unwanted input signals and, thus, generation of harmonic signals is prevented appropriately.

The level control 38 is formed as an automatic gain control such that the level of the electromagnetic signal output at the pre-selection unit 22 and forwarded to the transmission path 16 is maintained constant irrespective of the level of the electromagnetic signal received via the antenna system 12.

In addition, the dynamic range can be shifted automatically with respect to the level of the electromagnetic signal received. Thus, the usable dynamic range is optimized.

Figure 2:
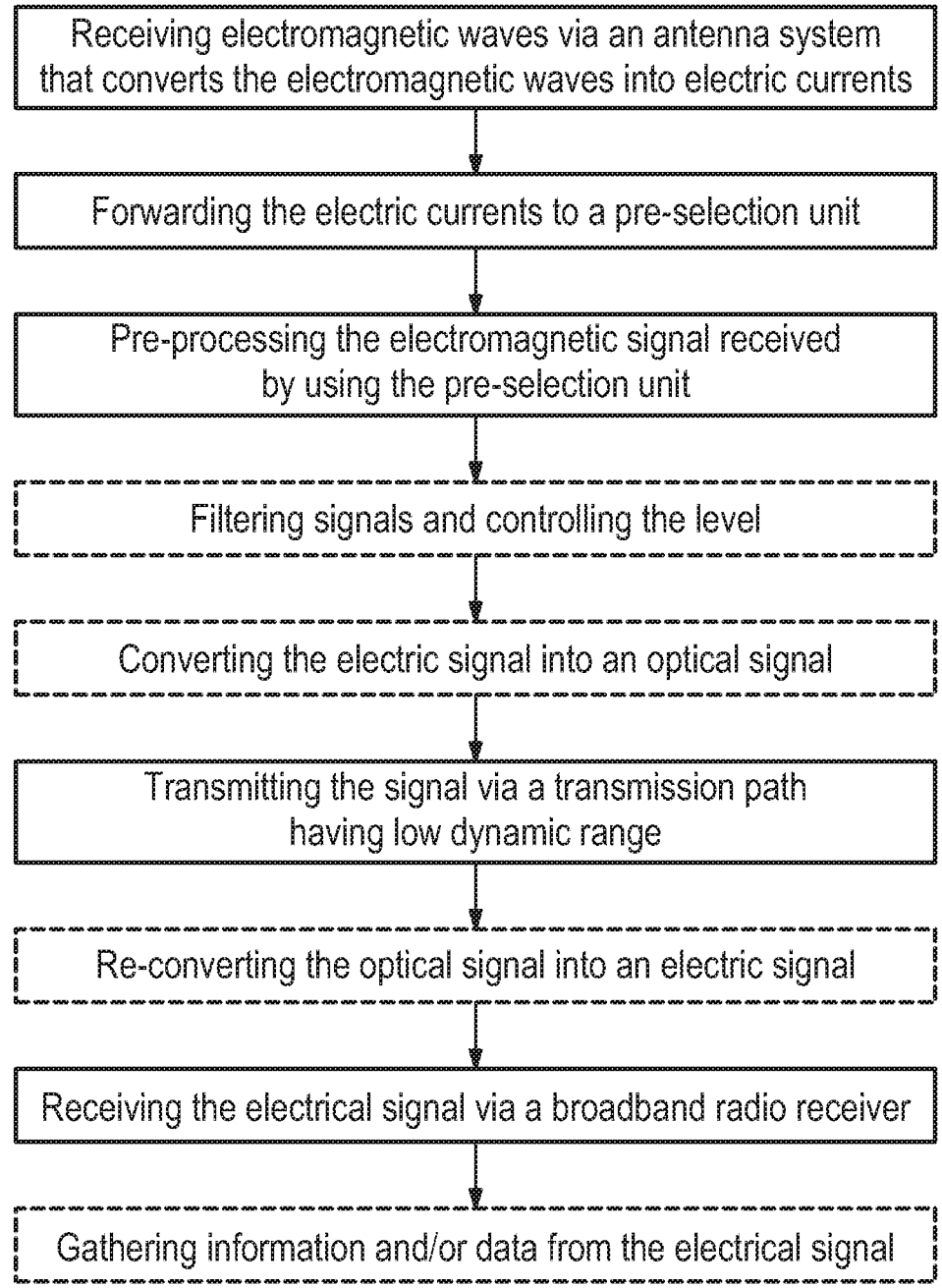
FIG. 2 shows a flow-chart representing a method for processing an electromagnetic signal.

The system 10 shown in FIG. 1 can be used for performing the method illustrated by the flow-chart of FIG. 2. According to the flow-chart, the system 10 receives an electromagnetic signal, e.g., electromagnetic waves, via the antenna system 12. The electromagnetic waves may correspond to a radio frequency signal.

The antenna system 12 converts the electromagnetic waves into an electrical signal, for instance an electric current. Then, the electrical signal, e.g., the electric current, is forwarded to the pre-selection unit 22 for pre-processing purposes.

The filter bank 34 of the pre-selection unit 22, e.g., its several sub-octave filters 36, reduces the number of unwanted incoming signals or the number of unwanted portions of the electromagnetic signal received. Thus, it is prevented that unwanted harmonics are generated. Accordingly, the electromagnetic signals received via the antenna system 12 are pre-selected by the pre-selection unit 22 ensuring that only wanted signal (portions) are forwarded for further processing.

In addition, the level of the electromagnetic signals is controlled via the level control 38 of the pre-selection unit 22. As already mentioned, the level control 38 may be an automatic gain control such that the level of the output signal is substantially maintained constant irrespective of the level of the electromagnetic signal received by the antenna system 12.

Then, the pre-selected electromagnetic signal is forwarded to the optical transmitter 24 that converts the electrical signal into an optical signal such that the optical signal can be forwarded via the optical fiber 28 over the long distance. Accordingly, the optical fiber 28 may have a length of several meters, for instance 10-100 meters or even more.

The optical receiver 26 corresponding to the end of the optical transmission path 16 reconverts the optical signal into an electrical signal for further processing. The electrical signal forwarded is then received by the broadband radio receiver 14 in order to gather information and/or data submitted by the electromagnetic signal received. This information or data obtained in the broadband radio receiver 14 is provided to the control and analyzing unit 30 for analyzing purposes.

The broadband radio receiver 14 is permanently connected to the pre-selection unit 22 via the control and feedback line 32. Thus, the radio receiver 14 receives information about the state of the pre-selection unit 22, for instance the parameters used by the pre-selection unit 22 during the pre-selection process continuously without any dead time. The broadband radio receiver 14 may be informed about the status of the filter bank 34, in particular the status of the tunable and switchable sub-octave filters 36, and the status of the level control 38. Accordingly, the broadband radio receiver 14 is enabled to determine the correct parameters of the electromagnetic signal received and processed by the system 10.

For instance, the broadband radio receiver 14 is informed about any attenuation performed by the pre-selection unit 22, in particular the level control 38. Hence, the broadband radio receiver 14 uses this information for determining the correct level (original power) of the electromagnetic signal received via the antenna system 12 without the attenuation that has been done by the pre-selection unit 22.

Additionally, the broadband radio receiver 14 is able to control the pre-selection unit 22 at least partly which means that the broadband radio receiver 14 specifies the parameters used by the pre-selection unit 22 for pre-processing the electromagnetic signals.

Further, the pre-selection unit 22 may be configured to be self-controlled. Alternatively or supplementary, the pre-selection unit 22 can be controlled by an external component that is connected to the pre-selection unit 22. This external component can be manually controlled by the user of the system 10.

The controlling and regulation of the pre-selection unit 22 can be performed solely by the pre-selection unit 22 (self-controlled), the broadband radio receiver 14 or the external component. Alternatively or supplementary, these modules can control and regulate the pre-selection unit 22 in parts simultaneously, for instance certain parameters are controlled by the broadband radio receiver 14 whereas other parameters are controlled by the pre-selection unit 22 in a self-controlled manner and the external component. Of course, functions of the pre-selection unit 22 or such modules can be implemented in either software or hardware or a combination of software and hardware.

Moreover, the antenna system 12, the pre-selection unit 22 and/or the optical transmitter 24 may be part of a first device 40 whereas the optical receiver 26, the broadband radio receiver 14 and/or the control and analyzing unit 30 are part of a second device 42. Both devices 40, 42 are separately formed and connected with each other via the optical fiber 28. For instance, the pre-selection unit 22 and the optical transmitter 24 may be housed in a common housing of the first device 40. In addition, the optical receiver 26, the broadband radio receiver 14 and/or the control and analyzing unit 30 may be housed in another common housing corresponding to the second device 42. Accordingly, these devices 40, 42 each can be adapted such that they may be used with an already existing system.

In general, the system 10 ensures high information security, high interference immunity and good performance even though long distances have to be bridged between the antenna system 12 and the broadband radio receiver 14.

The high security and high interference immunity are ensured by using the optical transmission path, in particular the optical fiber 28. The normally occurring drawbacks while using an optical transmission path such as low dynamic range, high noise factor and high non-linearity are compensated since the pre-selection unit 22 is located upstream of the optical transmission path 16. The pre-selection unit 22 ensures that the dynamic range of the transmission path 16 is used at the maximum. Accordingly, the electromagnetic signals received are pre-processed by the pre-selection unit 22 such that the optical transmission path 16 is used in an optimal manner. Disturbing influences of the non-linearity are minimized by using the filter bank 34, for instance. Thus, harmonic disturbances are suppressed. Further, the dynamic range is shifted to its optimum by the level control 38 of the pre-selection unit 22. Thus, compression of the electromagnetic signal is avoided.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A system for processing an electromagnetic signal, wherein said system comprises:
   a transmission path with limited dynamic range;
   a broadband radio receiver positioned on the transmission path; and
   a pre-selection unit positioned upstream of the broadband radio on the transmission path, the pre-selection unit configured to pre-select signal portions and control the level of the output electromagnetic signal, wherein the level control of the pre-selection unit is formed as an automatic gain control such that the output level of the electromagnetic signal forwarded to the transmission path is maintained constant irrespective of the level of the electromagnetic signal received, and wherein the broadband radio receiver is connected to the pre-selection unit via a feedback line.

2. The system according to claim 1, wherein an antenna system is provided that is connected to said pre-selection unit.

3. The system according to claim 1, wherein said transmission path is an optical transmission path.

4. The system according to claim 1, wherein an optical transmitter is provided that is positioned downstream of said pre-selection unit.

5. The system according to claim 1, wherein an optical receiver is provided that is positioned downstream of said optical transmitter.

6. The system according to claim 5, wherein said broadband radio receiver is positioned downstream of said optical receiver.

7. The system according to claim 1, wherein the broadband radio receiver is configured to control the pre-selection unit.

8. The system according to claim 1, wherein said pre-selection unit is configured to be at least one of self-controlled and controlled by an external component being connected to said pre-selection unit.

9. The system according to claim 2, wherein a first device is provided which comprises at least one of said antenna system, said pre-selection unit and said optical transmitter.

10. The system according to claim 5, wherein a second device is provided which comprises at least one of said optical receiver and said broadband radio receiver.

11. The system according to claim 1, wherein a control and analyzing unit is provided.

12. The system according to claim 11, wherein said control and analyzing unit is connected to said broadband radio receiver.

13. The system according to claim 1, wherein said pre-selection unit comprises at least one sub-octave filter.

14. A method for processing an electromagnetic signal, comprising:
    receiving an electromagnetic signal via an antenna system;
    pre-selecting the electromagnetic signal by using a pre-selection unit that is formed as an automatic gain control such that the output level of the electromagnetic signal forwarded to a transmission path with limited dynamic range is maintained constant irrespective of the level of the electromagnetic signal received;
    transmitting the electromagnetic signal via the transmission path;
    receiving the electromagnetic signal via a radio receiver that is connected to the pre-selection unit via the transmission path; and
    obtaining information about the state of the pre-selection unit via a feedback line in communication between the radio receiver and the pre-selection unit such that the radio receiver located downstream of the pre-selection unit on the transmission path is permanently informed about the interaction of the pre-selection unit located upstream of the radio receiver on the transmission path.

15. The method according to claim 14, wherein processing an electromagnetic signal is carried out by a system comprised of, at least in part. a transmission path with limited dynamic range and a pre-selection unit that is positioned upstream of said transmission path, said pre-selection unit being configured to pre-select signal portions and to control the level of the output electromagnetic signal.

16. The method according to claim 14, wherein said transmission path is an optical transmission path.

17. The method according to claim 14, wherein said electromagnetic signal is at least one of converted into an optical signal by using an optical transmitter prior to the said transmitting said electromagnetic signal and reconverted into an electrical signal by using an optical receiver after said transmitting said electromagnetic signal.

18. The method according to claim 14, wherein said pre-selection unit is at least one of self-controlled, controlled by said radio receiver and controlled by a third component that is connected to said pre-selection unit.

19. A system for processing an electromagnetic signal, comprising:
    a transmission path with limited dynamic range; and
    a pre-selection unit positioned on the transmission path, the pre-selection unit configured to pre-select signal portions and control the level of the output electromagnetic signal,
    wherein the level control of the pre-selection unit is formed as an automatic gain control such that the output level of the electromagnetic signal forwarded to the transmission path is maintained constant irrespective of the level of the electromagnetic signal received, and wherein the dynamic range is automatically shifted with respect to the level of the electromagnetic signal.

* * * * *